US012090606B2

(12) United States Patent
Beer et al.

(10) Patent No.: US 12,090,606 B2
(45) Date of Patent: Sep. 17, 2024

(54) TOOL AND MOTOR ANTI-ROTATION

(71) Applicant: Snap-on Incorporated, Kenosha, WI (US)

(72) Inventors: Joshua M. Beer, Kenosha, WI (US); Jason Genz, Kenosha, WI (US); Craig Brouwers, Kenosha, WI (US); Michael T. Rajzer, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 642 days.

(21) Appl. No.: 17/028,054

(22) Filed: Sep. 22, 2020

(65) Prior Publication Data

US 2022/0088753 A1 Mar. 24, 2022

(51) Int. Cl.
*B25B 21/00* (2006.01)

(52) U.S. Cl.
CPC .................................. *B25B 21/004* (2013.01)

(58) Field of Classification Search
CPC ....... B25B 13/46; B25B 13/48; B25B 13/481; B25B 21/00; B25B 21/002; B25B 21/004; B25B 23/00; B25B 23/007; B25B 23/0021; B25B 23/0028; B25F 5/00; B25F 5/02; Y10T 403/7005; Y10T 403/7007
USPC ................. 81/54, 57.39; 173/217; 29/525.01
See application file for complete search history.

(56) References Cited

U.S. PATENT DOCUMENTS 1,954,051 A * 4/1934 Moon .................. E21B 17/046 279/94
2,732,751 A * 1/1956 Heidecke et al. ..... G03B 17/12 359/830
4,617,843 A 10/1986 Nishida et al.
4,635,732 A 1/1987 Gotsch et al.
5,251,706 A 10/1993 Evans
5,269,733 A 12/1993 Anthony, III
5,372,464 A * 12/1994 Bureller ................. B23B 49/02 408/241 B (Continued)

FOREIGN PATENT DOCUMENTS

AU 2021202197 11/2021
CN 1396855 A 2/2003

(Continued)

OTHER PUBLICATIONS

Canadian Office Action for corresponding CA Application No. 3,130,006, dated Dec. 7, 2022, 3 pages.

(Continued)

*Primary Examiner* — Brian D Keller
*Assistant Examiner* — Tim Brady
(74) *Attorney, Agent, or Firm* — Taft Stettinius & Hollister LLP

(57) ABSTRACT

The present invention relates to a motorized hand tool having a motor with a motor front casing adapted to resist rotation of the motor with respect to a housing of the tool, without use of extra fasteners or machining operations. The motor front casing includes first and second flanges and first and second tabs that protrude radially outwardly and that are disposed proximal to respective ends of the flanges. When the motor is installed, the tabs abut a ratchet head housing and are sandwiched between the ratchet head housing and a rib if a tool housing to resist motor rotation and ensure all forces are distributed across a whole face of the rib to minimize deformation of the rib and/or tool housing.

14 Claims, 7 Drawing Sheets

(56) References Cited

U.S. PATENT DOCUMENTS

| | | | | |
|---|---|---|---|---|
| 5,624,000 A | | 4/1997 | Miller | |
| 5,738,177 A | | 4/1998 | Schell et al. | |
| 5,771,516 A | * | 6/1998 | Huang | B25F 3/00 7/138 |
| 6,039,126 A | | 3/2000 | Hsieh | |
| 6,286,611 B1 | | 9/2001 | Bone | |
| 6,672,402 B2 | | 1/2004 | Ortt et al. | |
| 6,733,414 B2 | | 5/2004 | Elger | |
| 7,021,399 B2 | | 4/2006 | Driessen | |
| 8,074,856 B2 | | 12/2011 | Fukinuki et al. | |
| 8,485,276 B2 | | 7/2013 | Wei | |
| 9,120,213 B2 | | 9/2015 | Elger | |
| 9,149,917 B2 | | 10/2015 | Beer et al. | |
| 9,221,156 B2 | | 12/2015 | Bachman et al. | |
| 2003/0121676 A1 | * | 7/2003 | Ortt | B25F 5/02 173/1 |
| 2011/0272172 A1 | * | 11/2011 | Lau | B25F 3/00 173/170 |
| 2014/0338502 A1 | * | 11/2014 | Bachman | B25F 5/02 81/57.39 |
| 2014/0338503 A1 | * | 11/2014 | Beer | B25B 23/0007 173/217 |
| 2014/0338504 A1 | * | 11/2014 | Beer | B25B 23/00 81/57.39 |
| 2020/0198099 A1 | * | 6/2020 | Chen | B25B 21/00 |

FOREIGN PATENT DOCUMENTS

| | | | |
|---|---|---|---|
| CN | 201015860 | Y | 2/2008 |
| CN | 104162878 | A | 11/2014 |
| CN | 206578752 | U | 10/2017 |
| CN | 107443320 | A | 12/2017 |
| EP | 1464427 | A2 | 10/2004 |
| GB | 2320696 | A | 7/1998 |
| GB | 2595960 | A | 12/2021 |
| JP | 2013230528 | A | 11/2013 |
| TW | 201505777 | A | 2/2015 |

OTHER PUBLICATIONS

Examination Report for corresponding Application No. GB2112557.0 dated Nov. 22, 2022, 4 pages.

Chinese Office Action for corresponding Application No. 202111087684X dated Apr. 14, 2023, 10 pages.

Taiwan Office Action for corresponding TW Application No. 110134483, dated Jan. 12, 2022, 15 pages.

United Kingdom Office Action for corresponding UK Application No. GB2112557.0, dated Feb. 3, 2022, 7 pages.

Examination Report for corresponding Application No. 2021221397 dated Jul. 8, 2022, 3 pages.

Australian Examination Report No. 2 for corresponding AU Application No. 2021221397, dated May 12, 2023, 3 pages.

Australian Examination Report No. 3 for corresponding AU Application No. 2021221397, dated Jun. 21, 2023, 3 pages.

Canadian Office Action for corresponding CA Application No. 3, 130,006, dated Aug. 10, 2023, 3 pages.

Chinese Office Action for corresponding CN Application No. 202111087684.X, dated Oct. 28, 2023, 10 pages.

Chinese Patent Office, Decision of Rejection issued in corresponding Application No. 202111087684.X, dated Apr. 12, 2024, 7 pp.

Australian Patent Office, Examination Report issued in corresponding Application No. 2023204343, dated Jun. 26, 2024, 3 pp.

* cited by examiner

TOOL AND MOTOR ANTI-ROTATION

TECHNICAL FIELD OF THE INVENTION

The present invention relates to methods and device for providing anti-rotation of a motor relative to a tool housing.

BACKGROUND OF THE INVENTION

Power hand tools, such as, for example, motorized ratchet wrenches and drivers, are commonly used in automotive, industrial and household applications to install and remove threaded fasteners and apply a torque and/or angular displacement to a work piece, such as a threaded fastener, for example. Power hand tools such as cordless power ratchets and drivers generally include an electric motor contained in a clamshell type housing along with other components, such as switches, light emitting diodes (LEDs), and batteries, for example. The clamshell housing generally includes two or more housing portions fastened together by fasteners such as screws or rivets.

Power hand tools, such as, for example, motorized ratchet wrenches and drivers, that include a motor with a rotational shaft typically have rotational forces applied to the tool by the motor housing when engaged with a work piece. If rotation of the motor housing with respect to the tool is not adequately addressed, the rotational forces from the motor can cause the motor housing to rotate with respect to the housing of the tool, thus rendering the tool unusable. The current processes of assembling a motor to a drive member to address this issue, such as a ratchet head housing in a hand tool, generally involves use of elaborate fixtures, presses and/or hammers, for example. These processes involve fastening a motor end plate to a ratchet head housing with fasteners, such as pins or screws, to prevent the motor and ratchet housing from rotating relative to one another.

SUMMARY OF THE INVENTION

The present invention relates broadly to a motorized hand tool, such as, for example, a cordless ratchet wrench, that has a housing and a motor with a motor front casing adapted to resist rotation of the motor casing or motor housing with respect to the housing of the tool, without use of extra fasteners or machining operations. The motor front casing includes first and second flanges and first and second tabs that protrude radially outwardly and that are disposed proximal to respective ends of the flanges. When the motor is installed, the tabs abut a ratchet head housing and are sandwiched between the ratchet head housing and a rib if a tool housing to resist motor rotation and ensure forces are distributed across a whole face of the rib to minimize deformation of the rib and/or tool housing. The tabs on the motor front casing resist motor rotation better than previous designs, and simplify assembly by eliminating extra fasteners and/or machining steps.

In an embodiment, the present invention broadly relates to a tool including a ratchet housing, a motor coupled to the ratchet housing, and first and second clamshell housing portions coupled together around the motor. The ratchet housing includes a first slot formed by a lip disposed at least partially around a periphery of the ratchet housing, and a first aperture formed by an interruption in the lip. The motor includes a motor casing having a first flange and a first tab disposed adjacent the first flange, wherein the first flange is disposed in the first slot, and the first tab is disposed in the first aperture and abuts the lip proximal to the first slot. The first clamshell housing portion includes a first inwardly protruding rib disposed in the first aperture, wherein the first tab is disposed between the first inwardly protruding rib and the lip proximal to the first slot.

In another embodiment, the present invention broadly relates to a motor adapted to be coupled to a ratchet housing including a first slot formed by a lip disposed at least partially around a periphery of the ratchet housing, and a first aperture formed by an interruption in the lip. The motor includes a motor casing, a first flange protruding outwardly from the motor casing and adapted to be disposed in the first slot, and a first tab protruding outwardly from the motor casing adjacent to the first flange and adapted to be disposed in the first aperture and abut the lip proximal to the first slot.

In another embodiment, the present invention broadly relates to a method of coupling a motor to a tool. The method includes disposing a first flange of a motor casing in a first slot of a ratchet housing formed by a lip of the ratchet housing, and disposing a first tab of the motor casing in a first aperture of the ratchet housing formed by an interruption in the lip, and abutting the lip proximal to the first slot.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

Figure 1:
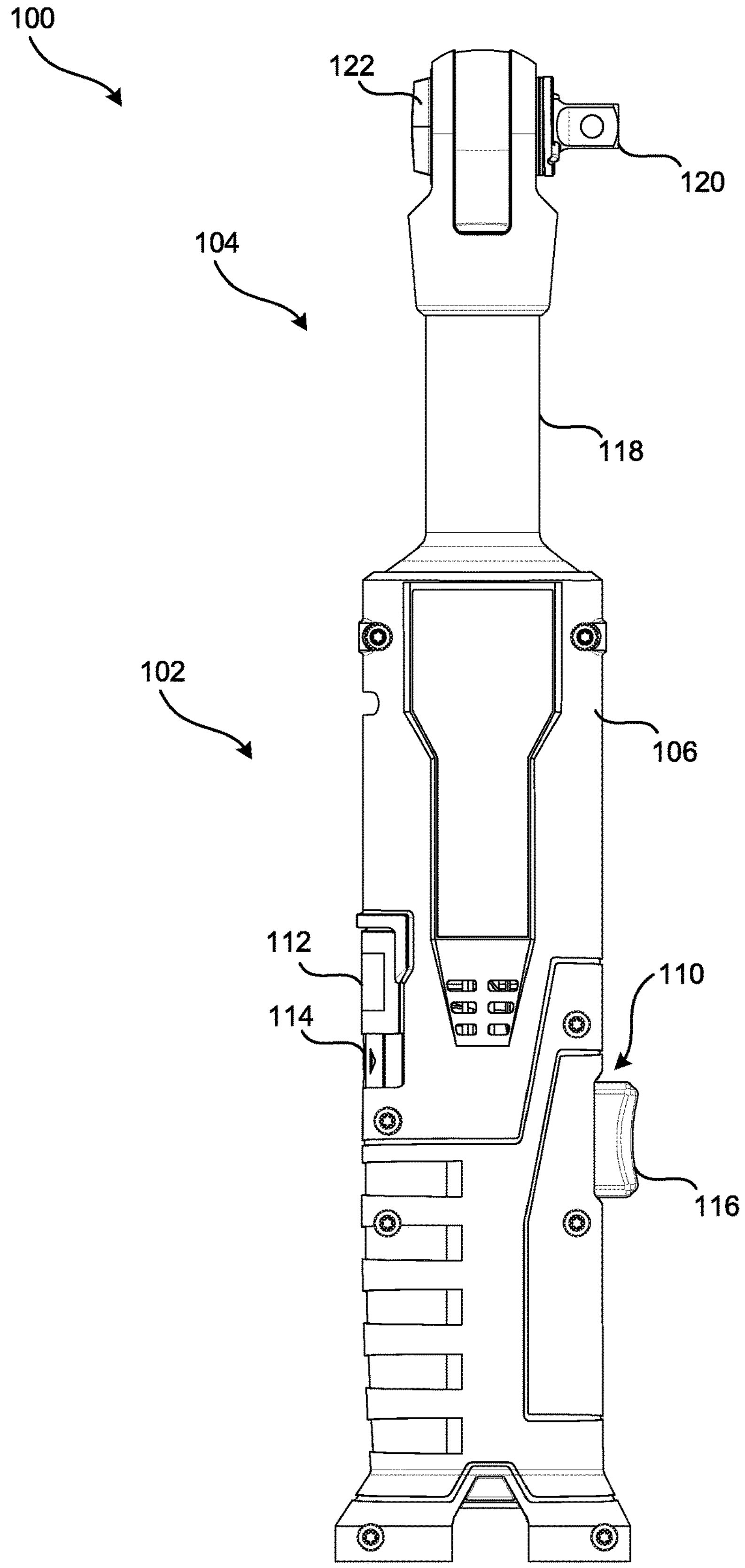
FIG. 1 is a first side view of an exemplar tool, according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term “present invention” is not intended to limit the scope of the claimed invention and is instead a term used to discuss exemplary embodiments of the invention for explanatory purposes only.

The present invention relates broadly to a motorized hand tool, such as, for example, a cordless ratchet wrench, that has a motor with a motor front casing adapted to resist rotation of the motor casing or motor housing with respect to a housing of the tool, without use of extra fasteners or machining operations. The motor front casing includes first and second flanges and first and second tabs that protrude radially outwardly and that are disposed proximal to respective ends of the flanges. When the motor is installed, the tabs abut a ratchet head housing and are sandwiched between the ratchet head housing and a rib of a tool housing to resist motor rotation and ensure forces are distributed across a whole face of the rib to minimize deformation of the rib and/or tool housing. The tabs on the motor front casing resist motor rotation better than previous designs, and simplifies assembly by eliminating extra fasteners and/or machining steps.

Figure 2:
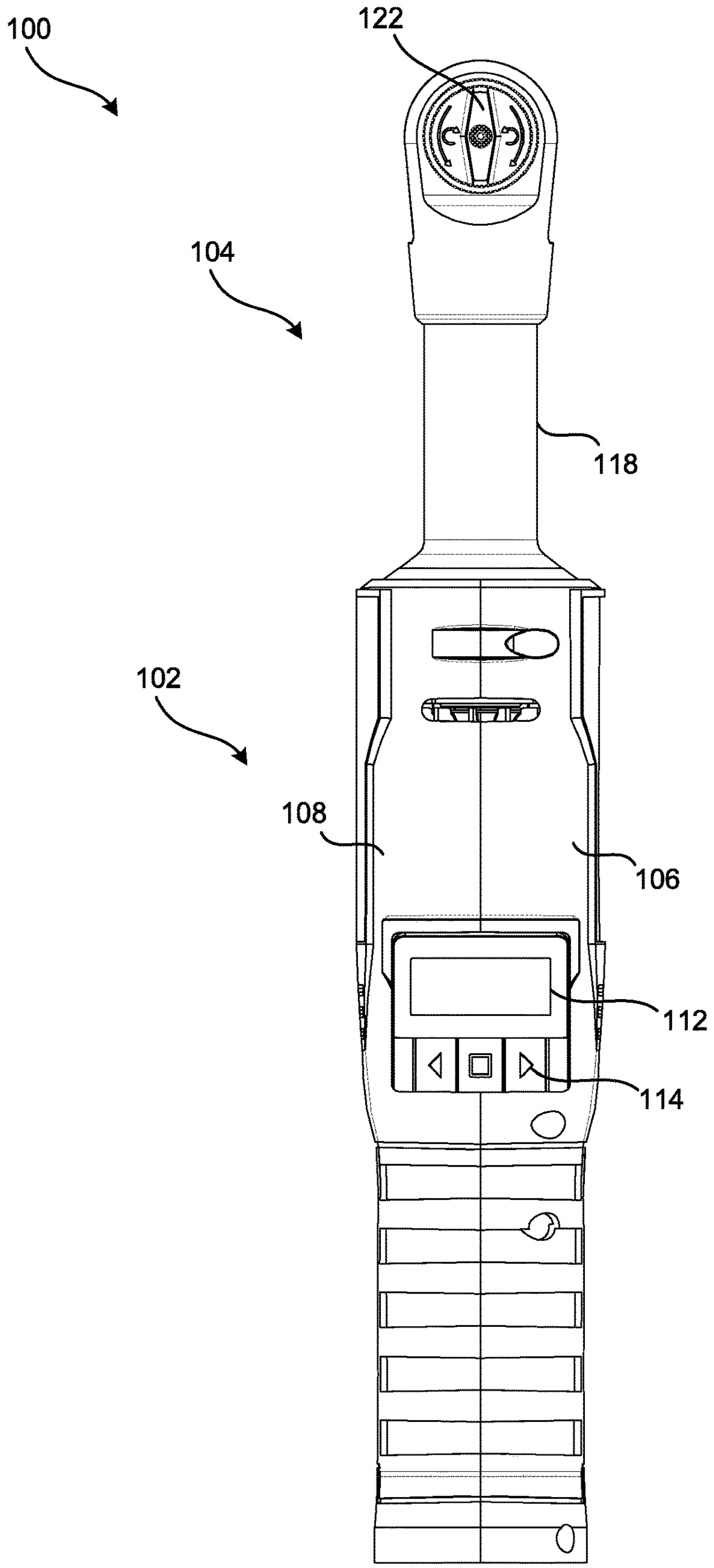
FIG. 2 is a second side view of the tool of FIG. 1, according to an embodiment of the present invention.

Referring to FIGS. 1 and 2, a tool 100, such as a cordless ratchet tool, includes a main tool housing 102 and a ratchet head assembly 104. The tool housing 102 may include first and second housing portions 106 and 108 that are coupled together in a clamshell type manner and securely coupled to the ratchet head assembly 104. The tool housing 102 may enclose or house an electric motor (as described in further detail below), a switch assembly 110, display 112 with buttons 114 for configuring and setting the tool 100, and one or more status indicators such as light emitting diodes, for example. The tool housing 102 may also include a textured grip to improve a user's grasp of the tool 100 during use.

In an embodiment, the tool 100 further includes a trigger 116 that can be actuated by a user to cause the tool 100 to operate. For example, the user can depress the trigger 116 inwardly to selectively cause power to be drawn from a power source and cause a motor to provide torque to the ratchet head assembly 104 in a desired rotational direction. Any suitable trigger 116 or switch can be implemented without departing from the spirit and scope of the present invention. For example, the trigger 116 may also be biased such that the trigger 116 is depressible inwardly, relative to the tool 100, to cause the tool 100 to operate, and a release of the trigger 116 causes the trigger 116 to move outwardly, relative to the tool 100, to cease operation of the tool 100 via the biased nature of the trigger 116. The trigger 116 and switch mechanism 110 may also be a variable speed type mechanism. In this regard, actuation or depression of the trigger 116 causes the motor to operate at a faster speed the further the trigger 116 is depressed.

The ratchet head assembly 104 includes a ratchet housing 118, drive or drive lug 120, and selector knob 122, for example. The drive 120 is adapted to apply torque to a work piece, such as a fastener, via an adapter, bit, or socket coupled to the drive 120, such as a bi-directional ratcheting square or hexagonal drive. As illustrated, the drive 120 is a "male" connector designed to fit into or matingly engage a female counterpart. However, the drive 120 may be a "female" connector designed to matingly engage a male counterpart. The drive 120 may also be structured to directly engage a work piece without requiring coupling to an adapter, bit, or socket. The rotational direction of the drive 120 can be selected by rotation of the selector knob 122 to be either a first or second rotational direction (such as, clockwise or counterclockwise).

Figure 3:
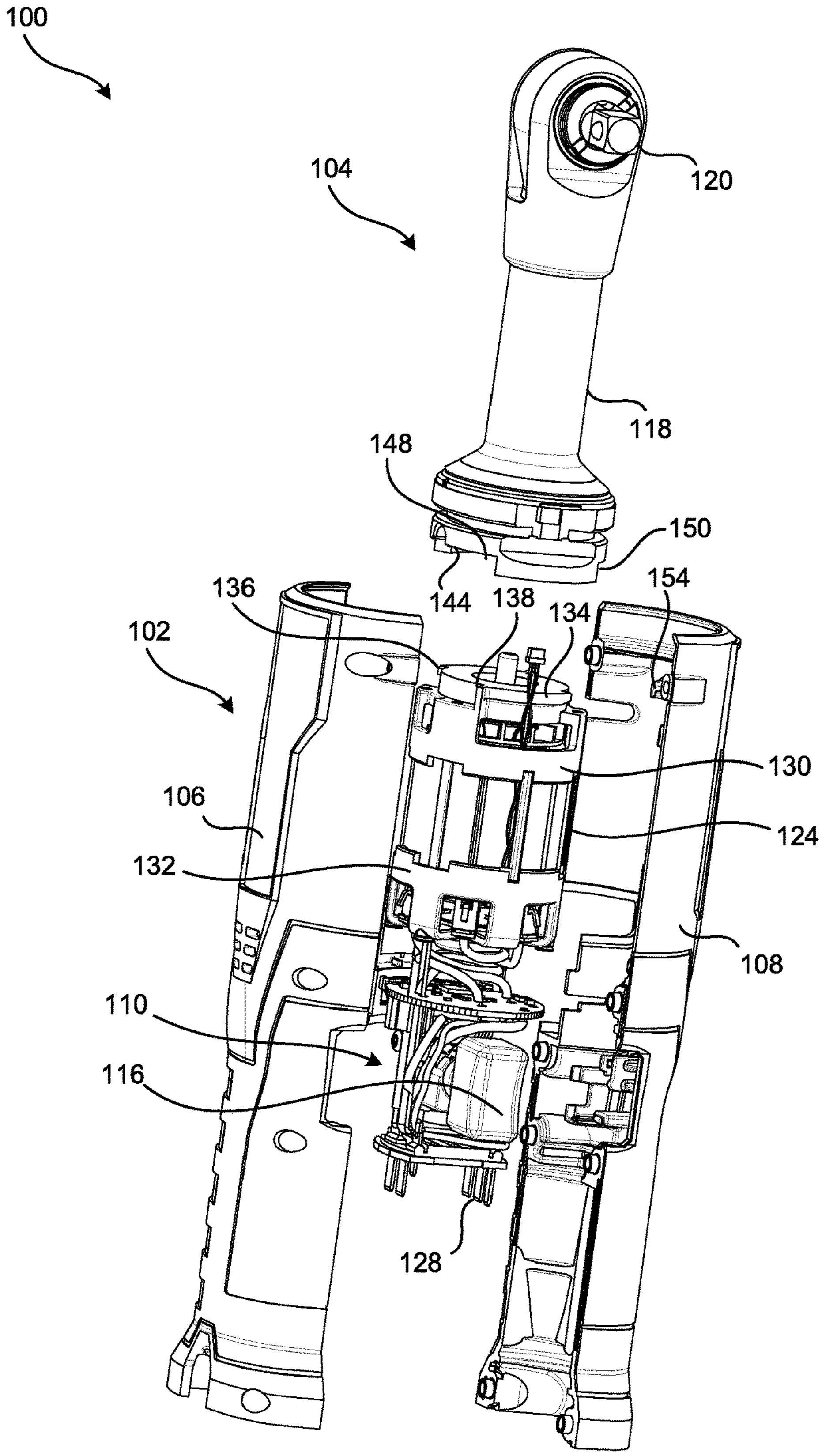
FIG. 3 is a first perspective exploded view of the tool of FIG. 1, according to an embodiment of the present invention.
Figure 4:
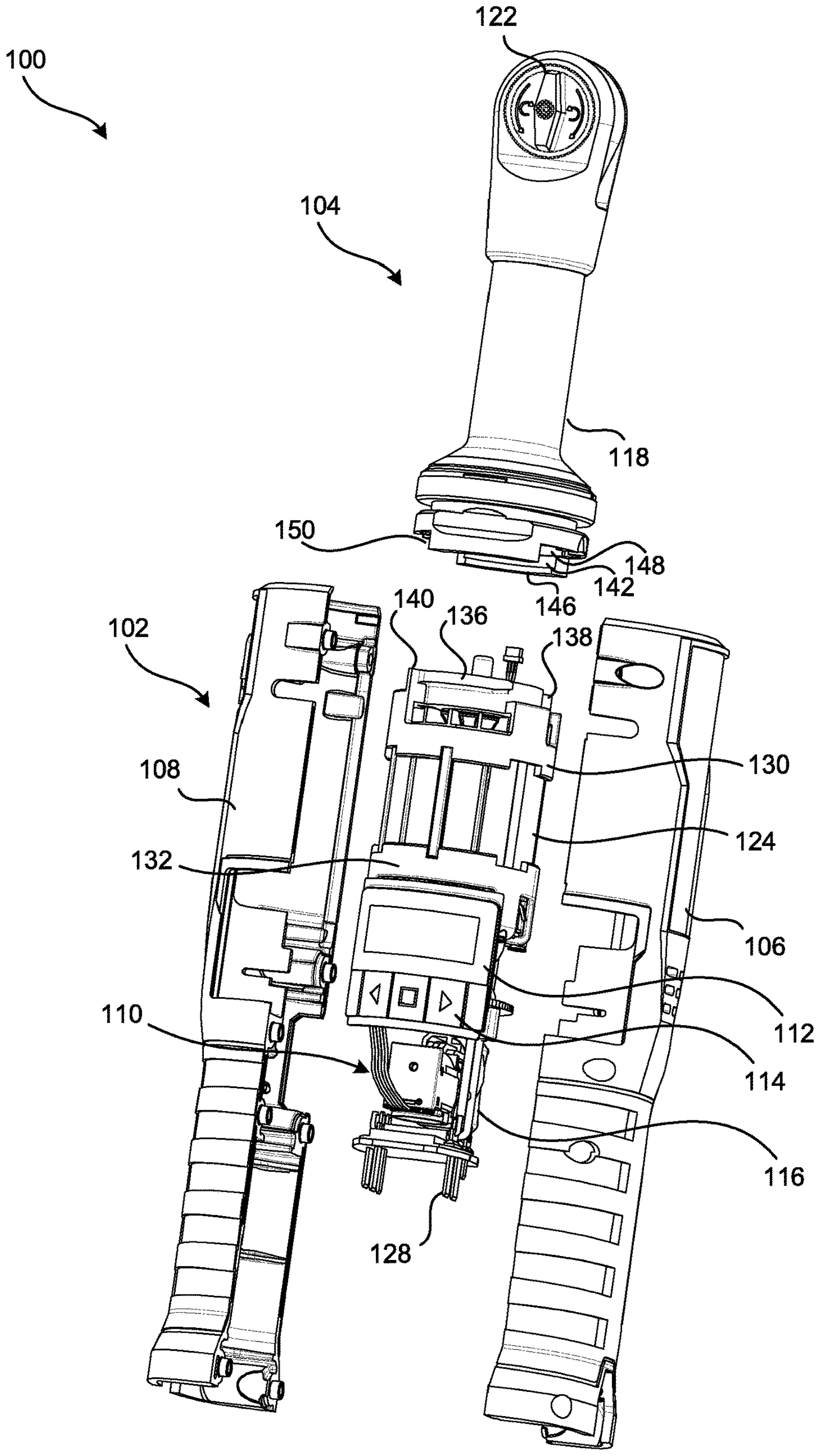
FIG. 4 is a second perspective exploded view of the tool of FIG. 1, according to an embodiment of the present invention.
Figure 5:
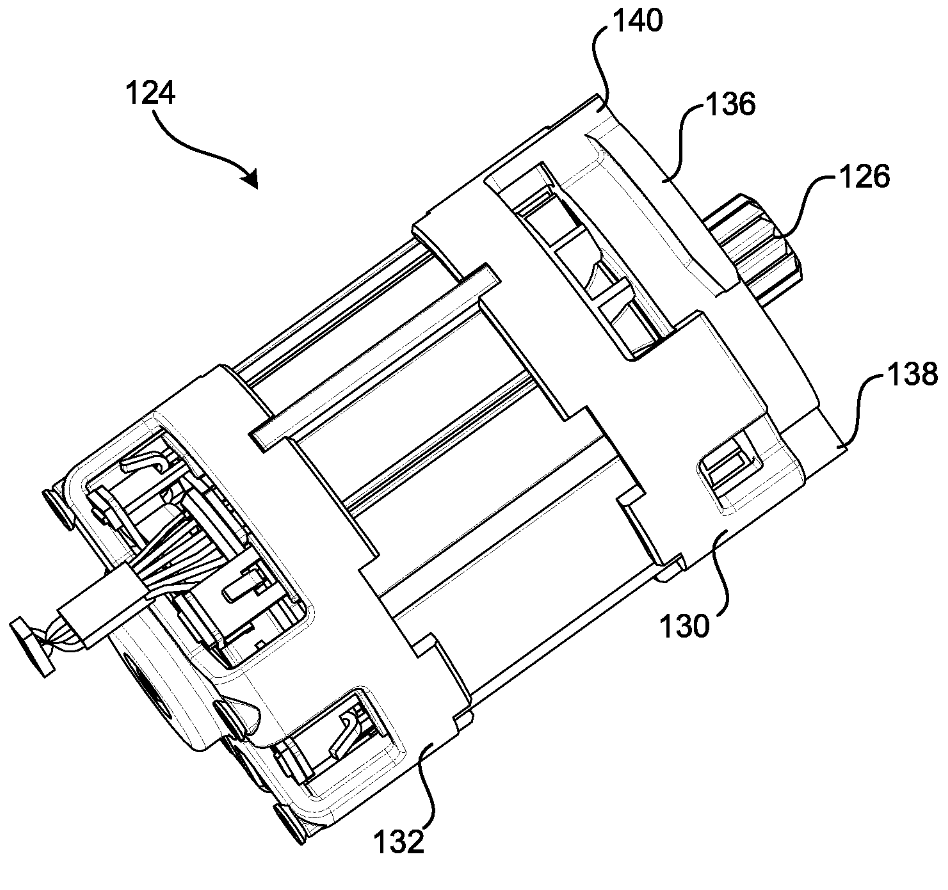
FIG. 5 is a perspective view of a motor, according to an embodiment of the present invention.
Figure 6:
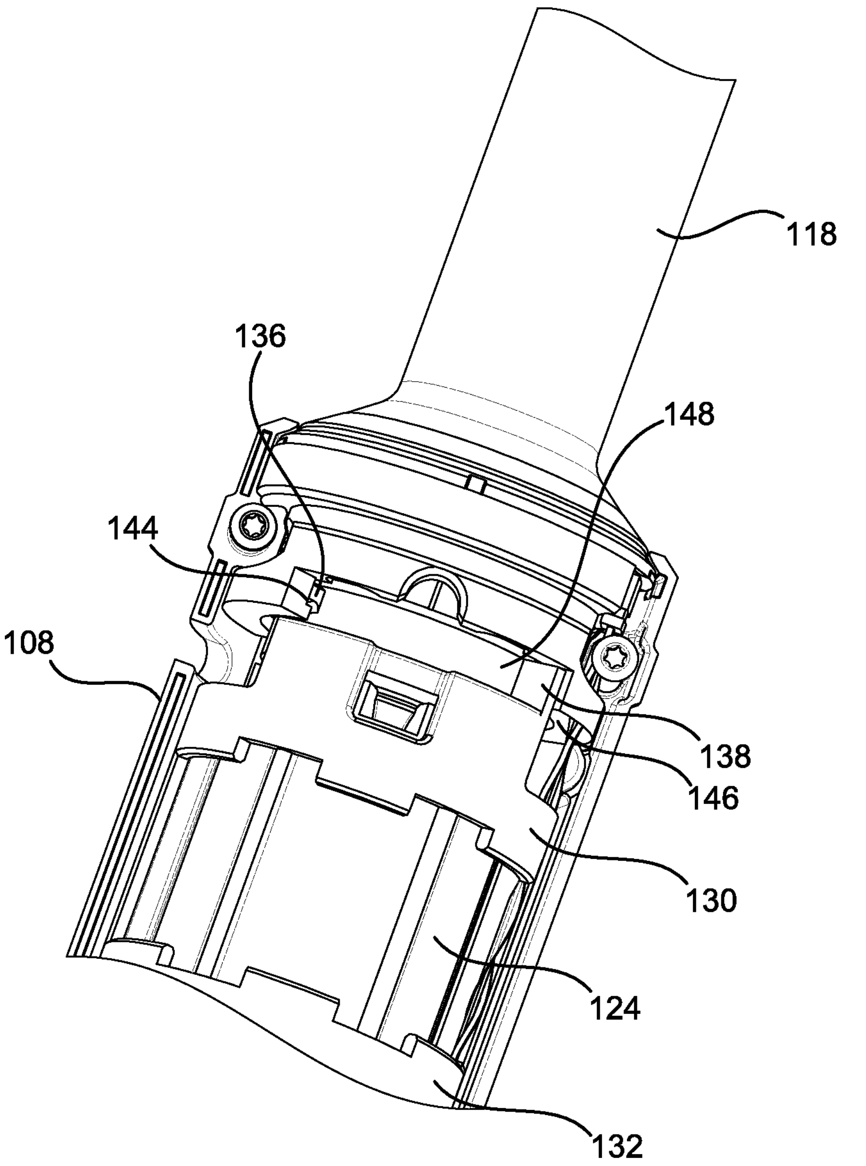
FIG. 6 is a side view of the motor of FIG. 5 installed in an exemplar tool, with a portion of a housing of the tool removed, according to an embodiment of the present invention.

Referring to FIGS. 3-5, the tool 100 includes a motor 124 with a motor housing and a motor drive gear 126 adapted to operably engage the ratchet head assembly 104, and that provides torque to the tool 100 and, in turn, to the drive 120. The motor 124 may be a brushless or brushed type motor, or any other suitable motor. A power source (not shown) can be associated with the tool 100 to provide electronic or other forms of power to the tool 100, such as, for example, electric, hydraulic, or pneumatic, to drive the motor 124. In an embodiment, the power source can be housed in an end of the tool housing 102, opposite the drive 120, midsection, or any other portion of the tool 100. The power source may also be an external component that is not housed by the tool 100, but that is operatively coupled to the tool 100 through, for example, wired or wireless means. In an embodiment, the power source is a battery that is adapted to be disposed in the end of the tool housing 102 and electrically couple to corresponding terminals 128 of the tool 100.

As illustrated, the motor 124 and switch mechanism 110 are disposed in the tool housing 102, and the switch mechanism 110 is operably coupled to the motor 124. The actuatable trigger 116 is operably coupled to the switch mechanism 110, such that actuation of the trigger 116 (such as depression of the trigger 116) causes the motor 124 to operate and selectively rotate the drive 120 in either one of first and second rotational directions (clockwise or counterclockwise) in a well-known manner. The switch mechanism 110 may also be coupled to a controller (which may include a printed circuit board) including terminals 128 or battery contacts that operably couple to corresponding electrical contacts on a removable battery.

Referring to FIGS. 3-6, the motor 124 or motor housing is adapted to be coupled to the ratchet head assembly 104, via the ratchet housing 118. The motor 124 includes a motor front casing 130 and a motor rear casing 132. In an embodiment, the motor front casing 130 includes one or more outwardly protruding semi-annular flanges, such as diametrically opposing first and second semi-annular flanges 134, 136, and one or more outwardly protruding tabs, such as diametrically opposing first and second tabs 138, 140. As illustrated, the first and second tabs 138, 140 are respectively disposed adjacent to ends of the first and second semi-annular flanges 134, 136. The ratchet housing 118 includes corresponding semi-annular slots, such as diametrically opposing first and second slots 142, 144 formed by an undercut behind a lip 146 disposed at least partially around a periphery of the ratchet housing 118.

The first and second flanges 134, 136 are configured to respectively fit in the first and second semi-annular slots 142, 144. One or more discontinuities in the lip 146 create one or more apertures, such as first and second apertures 148, 150, that are sized to respectively receive the first and second semi-annular flanges 134, 136 during assembly of the motor 124 to the ratchet head 118. For example, the motor 124 is coupled to the ratchet housing 118 by pushing the first flange 134 of the motor front casing 130 into the first aperture 148 and the second flange 136 of the motor front casing 130 into the second aperture 150; then rotating the motor 124 relative to the ratchet housing 118 (for example, by about 90 degrees) until the first flange 134 is disposed and engaged in the first semi-annular slot 142 of the ratchet housing 118 and the second flange 136 is disposed and engaged in the second semi-annular slot 144 of the ratchet housing 118. When the motor 124 is coupled to the ratchet housing 118, the first tab 138 is disposed in the first aperture 148 and abuts an end of the lip 146 adjacent to an end of the first semi-annular slot 142, and the second tab 140 is disposed in the second aperture 150 and abuts an end of the lip 146 adjacent to an end of the second semi-annular slot 144. Thus, tabs 138, 140 abut the ratchet housing 118 to prevent rotation of the motor housing of the motor 124 with respect to the ratchet housing 118.

Figure 7:
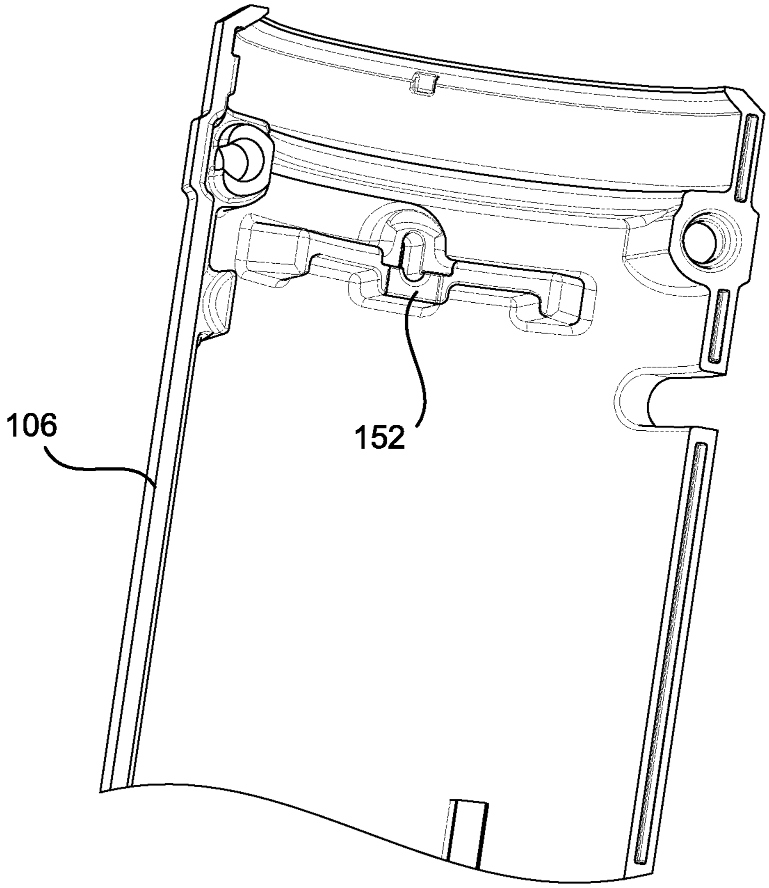
FIG. 7 is a partial view of a housing portion of the tool, according to an embodiment of the present invention.

Each of the first and second housing portions 106, 108 may also include a rib (such as first and second ribs 152, 154) protruding inwardly and shaped to substantially fill the respective first and second apertures 148, 150 when the clam shell housing is assembled to the ratchet housing 118 and motor 124. Referring to FIG. 7, the second rib 154 is shown, however, it should be appreciated that the first rib 152 has a substantially same shape. For example, the first rib 152 is disposed in the first aperture 148, and sandwiches the first tab 138 between the first rib 152 and the end of the lip 146 adjacent to the end of the first semi-annular slot 142. Similarly, the second rib 154 is disposed in the second aperture 150, and sandwiches the second tab 140 between the second rib 154 and the end of the lip 146 adjacent to the end of the second semi-annular slot 144. Thus, tabs 138, 140 abut the ratchet housing 118 and the respective first and second ribs 152, 154 to prevent rotation of the motor housing of the motor 124 with respect to the ratchet housing 118.

In an embodiment, the ratchet housing 118 is made of a metal material, while the first and second housing portions 106 and 108 are made of a plastic-type material. The tabs 138, 140 resist motor rotation and ensure forces are distributed across a whole face of the ribs 152, 154 to minimize deformation of the ribs 152, 154 and/or tool housing. The tabs 152, 154 on the motor front casing 130 resist motor rotation more robustly than previous designs, and simplify assembly by eliminating extra fasteners and/or machining steps.

In an embodiment, the first and second apertures 148, 150, and the first and second ribs 152, 154 may shaped to resist rotation of the ratchet housing 118 with respect to the tool housing 102, when assembled together. For example, each of the first and second apertures 148, 150 may include a semi-circular aperture portion, and each of the first and second ribs 152, 154 may include a corresponding semi-circular rib portion. The semi-circular rib portions respectively engage or are disposed in the semi-circular aperture portions. The respective engagement of the semi-circular rib portions in the semi-circular aperture portions resists rotation of the ratchet housing 118 with respect to the tool housing 102 (such as, the first and second housing portions 106 and 108).

As discussed herein, the tool 100 is a ratchet type wrench. However, the tool 100 can be any electrically powered or motorized hand-held tool, including, without limitation, a drill, router, or impact wrench, ratchet wrench, screwdriver, or other powered tool, that is powered by electricity via an external power source (such as a wall outlet and/or generator outlet) or a battery.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool, comprising:

a ratchet housing including a first slot formed by a lip disposed at least partially around a periphery of the ratchet housing, and a first aperture formed by an interruption in the lip;

a motor housing coupled to the ratchet housing, the motor housing including a motor casing having a first flange and a first tab disposed adjacent to and extending outwardly relative to the first flange, wherein the first flange is disposed in the first slot, and the first tab is disposed in the first aperture and abuts the lip proximal to the first slot; and a first housing portion including a first inwardly protruding rib disposed in the first aperture, wherein the first tab is disposed between the first inwardly protruding rib and the lip proximal to the first slot.

2. The tool of claim 1, wherein the ratchet housing includes a second slot and a second aperture.

3. The tool of claim 2, wherein the second slot and second aperture diametrically oppose the respective first slot and first aperture.

4. The tool of claim 2, wherein the motor casing includes a second flange and a second tab disposed adjacent to the second flange.

5. The tool of claim 4, wherein the second flange and second tab diametrically oppose the respective first flange and first tab.

6. The tool of claim 4, wherein the second flange is disposed in the second slot, and the second tab is disposed in the second aperture and abuts the lip proximal to the second slot.

7. The tool of claim 4, further comprising a second housing portion coupled to the first housing portion.

8. The tool of claim 7, wherein the second housing portion includes a second inwardly protruding rib disposed in the second aperture, and the second tab is disposed between the second inwardly protruding rib and the lip proximal to the second slot.

9. The tool of claim 1, wherein the first inwardly protruding rib includes a semicircular rib portion, and the first aperture includes a first semicircular aperture portion, and the semicircular rib portion is disposed in the first semicircular aperture portion.

10. A method of coupling a motor to a tool, comprising: disposing a first flange of a motor casing in a first slot of a ratchet housing formed by a lip of the ratchet housing;

disposing a first tab of the motor casing in a first aperture of the ratchet housing formed by an interruption in the lip, wherein the first tab is disposed adjacent to and extends outwardly relative to the first flange and abuts the lip proximal to the first slot; and disposing a first inwardly protruding rib of a first clamshell housing portion in the first aperture, wherein the first tab is disposed between the first inwardly protruding rib and the lip proximal to the first slot.

11. The method of claim 10, further comprising disposing a second flange of the motor casing in a second slot of the ratchet housing.

12. The method of claim 11, further comprising disposing a second tab of the motor casing in a second aperture of the ratchet housing, and abutting the lip proximal to the second slot.

13. The method of claim 12, further comprising disposing a second inwardly protruding rib of a second clamshell housing portion in the second aperture, wherein the second tab is disposed between the second inwardly protruding rib and the lip proximal to the second slot.

14. The method of claim 13, further comprising coupling the first and second clamshell housing portions together.

* * * * *